United States Patent [19]

Clancy et al.

[11] 4,450,446
[45] May 22, 1984

[54] METHOD AND SYSTEM FOR TRACKING TARGETS IN A PULSE DOPPLER RADAR SYSTEM

[75] Inventors: Steven J. Clancy, Elkridge; Robert A. Phillips, Crownsville, both of Md.

[73] Assignee: Westinghouse Electric Corp., Pittsburgh, Pa.

[21] Appl. No.: 268,545

[22] Filed: May 29, 1981

[51] Int. Cl.³ .................................................. G01J 13/32
[52] U.S. Cl. ................................. 343/7.7; 343/17.1 R
[58] Field of Search .................. 343/7.5, 17.1 R, 7.7, 343/17.2 PC, 7.4

[56] References Cited

U.S. PATENT DOCUMENTS 3,968,490  7/1976  Gostin .................... 343/17.2 PC X
4,035,799  7/1977  Hsiao ............................. 343/7.7
4,079,376  3/1978  Kirk, Jr. ....................... 343/7.7 X
4,093,949  6/1978  Evens .......................... 343/7.7 X
4,290,066  9/1981  Butler .......................... 343/7.5 X

FOREIGN PATENT DOCUMENTS 2044034  8/1980  United Kingdom ............... 343/7.7

Primary Examiner—Maynard R. Wilbur
Assistant Examiner—K. R. Kaiser
Attorney, Agent, or Firm—H. W. Patterson

[57] ABSTRACT

A medium to low PRF pulse doppler radar wherein the effect of the clutter notch filter is eliminated at times when the doppler frequency of the target approximates the doppler frequency of the clutter to continue tracking the target provided that the doppler frequency of the target and clutter are at different ranges.

7 Claims, 5 Drawing Figures

METHOD AND SYSTEM FOR TRACKING TARGETS IN A PULSE DOPPLER RADAR SYSTEM

GOVERNMENT CONTRACT

The U.S. Government has rights in this invention pursuant to Contract No. F33615-75-C-310 awarded by the Department of the Air Force.

BACKGROUND OF THE INVENTION

1. Field of the Invention

The present invention relates to pulse doppler radar; and more particularly, to an improved method and system for tracking targets.

2. Description of the Prior Art

In tracking moving targets, a pulse doppler radar system typically directs its antenna or other control system, if applicable, toward an echo signal that exhibits a particular doppler frequency shift and amplitude. Such systems exhibit a high degree of reliability in that, among other things, they are capable of rejecting undesirable signals that are caused by background clutter, for example. In discriminating between signals that represent a true target and signals that represent background clutter, the system typically uses a notch or highpass filter that rejects signals having a doppler frequency shift that correspond to main beam background clutter or other undesirable signals. However, under certain circumstances, the system may experience a blind region which occurs whenever the doppler frequency shift of the target coincides with the doppler frequency of the background main beam clutter. Under such circumstances, both the true target and the clutter frequency is rejected by the filter. The probability of such coincidence, and thus loss of the target, may be lessened by providing a filter that "notches out" or rejects a narrower frequency spectrum. However, such a solution, although satisfactory in many instances, results in a loss of capability of detecting desirable target signals under certain circumstances. Nevertheless, even under such circumstances, where the tracker momentarily loses its target, the system is provided with an estimating means such as a Kalman filter. With such an estimating means, the last known target position prior to the entry of the target in the blind region is extrapolated using available estimates of velocity and acceleration. During this estimating mode, the radar return signals are continuously monitored so that tracking may resume, if and when, the target's return signals emerge from the clutter notch rejection band; provided that the target's position in space is sufficiently close to the extrapolated position to permit radar illumination, detection, and tracking reacquisition. Although apparatus, which provides such a method of target reacquisition after tracking through a blind region, has proven effective under certain conditions, failure to reacquire the target may occur under conditions where the target fails to emerge from the clutter notch within a certain period of time. Also, the target may be able to defeat such reacqusition by performing high speed acceleration reversal maneuvers. Even when target reacquisition is successful after the system has completed the estimation mode, considerable transients may be generated by such reacquisition because extrapolation is seldom perfect due to radar noise and target maneuvers. Such transients are usually visible to the pilot which tends to reduce his confidence in the system.

Thus, it would be desirable to provide a method and system that would be able to continue the tracking of a target even though the doppler frequency of the target is rejected by the clutter notch filter of the system.

SUMMARY OF THE INVENTION

Broadly, and in accordance with the present invention, there is provided a method and system of tracking targets in a pulse doppler radar system wherein the effect of a main beam clutter notch filter is eliminated at least for the detected doppler frequency of interest at times while the doppler frequency of the target being tracked is within a predetermined proximity to the frequency rejection band of the clutter notch filter, and the tracking matrix indicates a selected low amplitude clutter environment of clutter. In another aspect, there is provided a method and system that effects clutter removal of the notch and actively samples the clutter to signal ratio to aid in making a determination as to whether or not full track on a target can continue or the estimating mode must be entered, if an estimating mode is provided.

More specifically, the present invention relates to a radar method and system where at times when the doppler frequency shift of the target and clutter approximate each other, the target and clutter effective doppler frequencies are both shifted respectively, in the same selected positive or negative direction to maximize the difference between the frequency of the clutter notch rejection band and the shifted doppler frequency of the target. While the frequency spectrum is in the shifted position, a threshold signal for detecting clutter is computed. The detection of clutter selected in accordance with the selected threshold causes actual tracking to either continue or to cease in favor of utilization of a Kalman estimating means. The shifting of the effective doppler frequency is removed when the measured doppler frequency of the target differs by a selected value from the rejection frequency of the clutter notch.

DESCRIPTION OF THE PREFERRED EMBODIMENT

Figure 1:
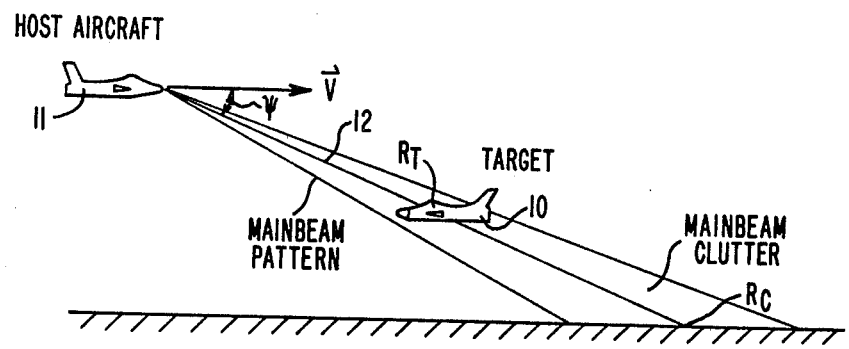
FIG. 1 is a pictorial illustration of an example of one typical situation for which the present invention has utility.

A brief discussion of the principals surrounding the present invention will be made prior to discussing the illustrated embodiment in detail. Generally, pulse doppler radars, operating with pulse repetition frequencies in the so-called low to medium range, permit signal detection and discrimination in both the time and frequency domains. Such a capability, permits measurement of both the range and the doppler frequency associated with each signal present in the radar receiver output. The present invention takes advantage of this capability to enable full target visibility when the target is detected at a range different from the main beam clutter return or when the clutter to signal ratio is low, as would happen in high altitude low grazing angle situations. Referring to the example of FIG. 1, there is illustrated a typical look-down situation which occurs in target tracking for airborne applications. A target 10 is below a host aircraft 11 at a range $R_T$. Main beam clutter is centered at range $R_c$, which of course, is greater than the range $R_T$ of the target. Radar beam 12 is pointed at an angle $\psi$ relative to velocity vector V relative to the host aircraft 11. Thus, a main beam clutter doppler frequency $f_c = f_o + 2 \times V (\cos \psi)/\lambda$ where $f_o$ and $\lambda$ are the radar transmit frequency and wavelength, respectively, is produced.

In a typical pulse doppler radar system, the main beam clutter is normally shifted from its main beam clutter doppler frequency $f_c$ to zero Hz, which shift is effected through conventional mixing processes driven by any well clutter frequency tracking mechanism. A main beam clutter notch is typically the spectrum of rejection of a high pass filter which naturally rejects the clutter that is centered around zero Hz doppler frequency. Without the benefit of the present invention, the doppler frequency of the target is rejected by the notch filter when such frequency is coincident with the doppler frequency of the clutter regardless of range of target and clutter. The rejection of the target frequency when utilizing the present invention occurs only when coincident clutter and target frequencies are detected at the same range. The target return signal which occurs at a doppler frequency at a specific time is tracked within a conventional tracking window of a matrix in both doppler and range. Within this tracking matrix, the absence of clutter indicates that the target is at a different range than such clutter, and therefore permits the present invention to become operative when the doppler frequency of the target approaches the rejection band of the clutter notch filter.

Figure 2:
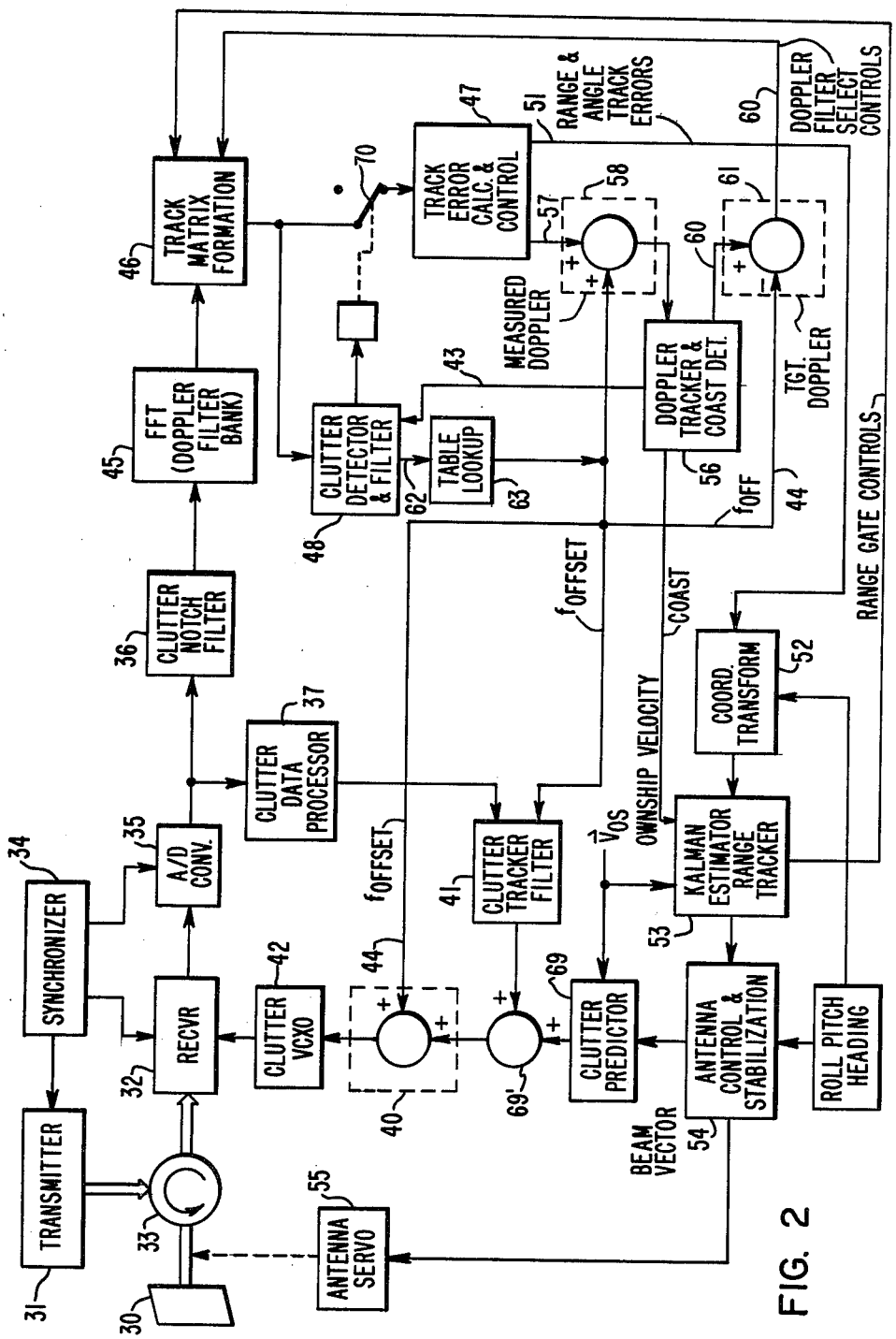
FIG. 2 is a block diagram of a typical pulse doppler radar tracking system that includes the present invention in accordance with one embodiment thereof.

Referring to FIG. 2, which is a general functional block diagram of a medium PRF pulse doppler tracking radar system incorporating the present invention, there is shown a conventional antenna 30 for propagating radar pulses generated by a transmitter 31, and for collecting echo pulses for input to a radar receiver 32. A circulator or receiver protector 33 connected between the transmitter 31 and receiver 32 effectively renders the transmitter and receiver operative alternately to generate the radar pulses at a selected pulse repetition frequency, and receive echo pulses between the transmitted pulses. A conventional synchronizer 34 serves to control in a well-known manner the actual timing of the transmission and reception cycles by the transmitter 31 and the receiver 32. An analog-to-digital converter 35 is provided at the output of the receiver 32 to convert the amplitude of the received echo pulses to a digital value. The A/D converter 35 has its output applied to a conventional clutter notch filter 36 and a clutter data processor and zero frequency discriminator 37. The notch filter 36 may be a conventional high pass filter that passes values corresponding to doppler frequencies indicative of desirable return signals and rejects those having a doppler frequency shift that would be indicative of undesirable signals or clutter.

The clutter data processor and zero frequency discriminator 37 detects the frequency of the signal from the A/D converter 35 and discriminates between the clutter frequency and target frequency information. It may detect a clump of clutter for example, whenever data representative of large amplitudes occurs in a plurality of individual adjacent range cells, or it may detect clutter in a single range cell. The processor 37 constitutes a portion of an active clutter loop that also includes a combining device 40, a clutter tracking filter 41, and a clutter voltage controlled oscillator 42.

The purpose of this clutter loop is to analyze the frequency of the clutter, and the frequency produced by the clutter frequency oscillator 42 in accordance with the voltage applied thereto by the clutter tracking filter 41 to maintain the average of the clutter echo signals at substantially zero Hz frequency. The clutter tracking filter 41 is a conventional filter that filters the frequency measurements of the clutter from the zero frequency discriminator and clutter data processor 37 as one input in selecting the proper voltage control for the voltage controlled oscillator 42. The clutter data processor 37, which may be a conventional frequency measurement device or discriminator detects the amplitude of the signals coming out of the A/D converter 35; and then when such detected amplitudes corresponds to clutter, a frequency analysis is accomplished. A large number of range cell samples that have large amplitude data is identified as clutter; and a clump if desired, may be determined by the large amplitudes being returned in adjacent interpulse periods. Under normal conditions, target signals above a selected doppler frequency pass through the notch or high pass filter 36. Thus, the clutter is distinguished from the target signals by the clutter data processor 37. The clutter tracking filter 41 is controlled by the frequency of the detected clutter 16 from the processor 37, which in turn controls the voltage controlled oscillator 42 as previously mentioned. The clutter loop, in summary, maintains the doppler frequency of the clutter coming out of the receiver 32 substantially at zero Hz in order to be rejected by the notch or high pass filter 36.

At times when the doppler frequency of the target approaches the clutter doppler frequency, an offset signal is applied at input 44 of the combiner or summing device 40. The application and consequences of such offset signal to the input 44 will be described in detail in connection with the description of operation of the described embodiment.

The data from the clutter notch filter 36 is input to a conventional doppler filter bank and fast fourier transform function 45 to change the digital signals from the time domain to the frequency domain in a well-known manner. In the described embodiment, it is assumed that there are sixty-four fast fourier transforms. In other words, samples are collected over sixty-four interpulse periods of the radar system and from that, there is generated what is equivalent to sixty-four adjacent frequency filters for each range cell of the system. A first filter, is at zero Hz and the last filter approaches the pulse repetition frequency of the system. The signals from each of the filters of 45 are applied to a well-known conventional tracking matrix formation referred to at 46. As the doppler filter bank is generating signals, for application to the track matrix formation 46, thirty-two adjacent "look" cells are selected for each of a possible sixty-four hundred cells of the matrix. The output of the track matrix 46 is applied to a tracking error calculation and control function 47, and a clutter detector and filter function 48.

Figure 3:
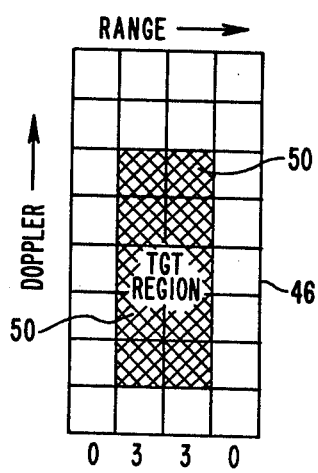
FIG. 3 is a diagram of a track matrix to illustrate target tracking utilized with the present invention.

The track matrix formation 46 may be any well-known type, which in accordance with the present embodiment is constituted by a four range gate by eight filter matrix centered about the target; such four by eight portion being shown in FIG. 3.

The tracking error calculation and control system function 47 is any well known conventional function that provides a measure of the doppler frequency of the target with respect to the notch and generates a value corresponding to the range and angle tracking error of the antenna 30. The tracking error function has an output 51 that is input to a coordinate transform function 52 for inputting values in a well-known manner to a Kalman estimator range tracker 53. The output of the Kalman estimator provides signals to an antenna control and stabilization function 54 which in conjunction with the signals corresponding to roll, pitch and heading of the radar platform, maintain the antenna 30 or other control system on target as controlled by an antenna servo mechanism 55. A clutter predictor function referred to at 69 provides an input to a summing device 69' along with the clutter tracking filter 41 to maintain the clutter within the notch as previously described in connection with the clutter loop. For a more detailed description of a Kalman type estimator and its associated functions, reference is made to U.S. Pat. No. 4,148,029 entitled "System for Estimating Acceleration of Maneuvering Targets" issued to Elmen C. Quesinberry.

A function for detecting the tracking of the doppler frequency of the target relative to the frequency of the main beam clutter to place the system in the estimating mode, is shown at block 56, which receives as its input, the signals on output 57 of the tracking error function 47 through a summing device 58. Adding an offset at 58 converts the measured target doppler frequency of 47 from the doppler frequency relative to the clutter notch filter 36 to a doppler frequency relative to the main beam clutter. Without the operation of the present invention, whenever the detector function 56 detects that the velocity of the target is getting close to the velocity of the earth and clutter, the system transfers to the COAST mode, and maintains the target tracking solely through the Kahlman estimator as is well-known in the prior art. The doppler tracker and coast detector 56, which computes target frequency with respect to main beam clutter frequency also has an output 60 which feeds back to the track matrix formation 46 through an algebraic summing device 61 that converts with an offset the output of 56 to a frequency relative to the main beam clutter to a frequency relative to the rejection notch of the filter 36 to compensate for the offset at 58 and selects the particular doppler filter of the matrix formation that is to be tracked output 43 of the detector 56.

In accordance with the present invention, the clutter detector and filter 48 provides an output on line 62 to a so-called lookup table or selector switch 63. Depending upon the control on the line 62, the selector 63 either provides a zero offset signal on line 44, a positive offset signal of 1800 Hz for example, or a negative offset signal of the same exemplary number of hertz. The output 44 is applied to each of the algebraic summing devices 40, 58, and 61 to provide selectively the particular selection from the selector or lookup table 63. The clutter detector and filter 48 is preferably implemented in software to perform the functions described.

The clutter detector 48 examines the area in and around the target for the presence of unwanted signals such as main beam clutter, sidelobe clutter, clutter discretes and ground movers, for example. In the described embodiment, this is accomplished by placing thresholds on each of the filters of the track matrix 46. This threshold is computed for each individual matrix to be a fraction of the target signal, such as 0.5 for example, which in general is the largest amplitude filter in the target region. The threshold is then used to compare each individual filter in the immediate vicinity of the target region 50 indicated by the shaded area in FIG. 3. If any filter exceeds this threshold, the presence of clutter is indicated. The fraction (0.5 in above example) of the target signal used to form the threshold is a function of the weighting of the fourier transform and the tracking bandwidths.

Figure 4:
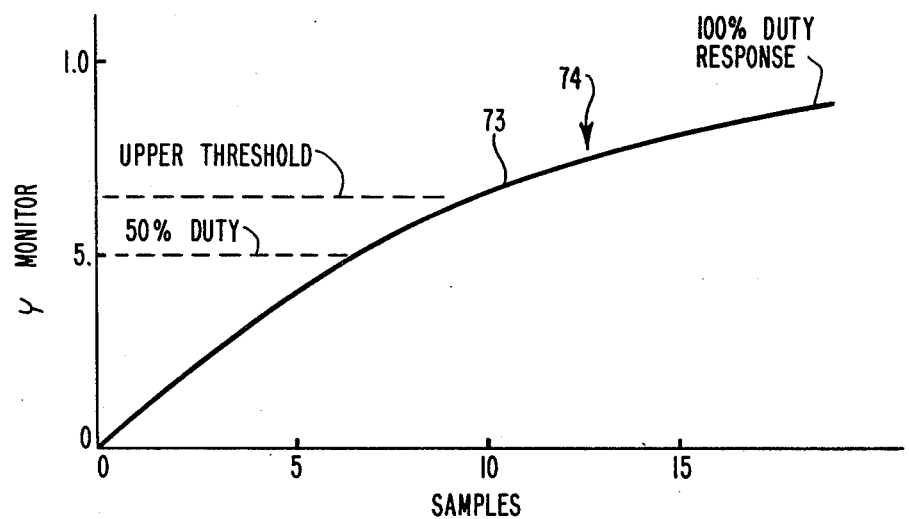
FIG. 4 is a graphical illustration of the clutter monitoring function of the present invention.

Once clutter is detected, the function 48 opens a switch 70. This disconnects the track matrix 46 from the track error calculation and control to prevent clutter from disturbing the tracker's estimate of the target state. This state is not disturbed since it may be needed to coast through the clutter if the clutter is of sufficient magnitude to prevent active tracking in accordance with the present invention. Further, once clutter has been detected, the monitor determines the dwell time of the target in the clutter. Since the described embodiment is assumed to be a multiple PRF system, it is entirely possible for one PRF to be clear and the other saturated with clutter, as would be the case when the target and clutter are in different range ambiguities. If such is the case, the monitor detects this and permits tracking to occur since the system can track easily with only a portion of its full complement of data. The monitor may be thought of as being mechanized as a low pass or RC filter. Referring to FIG. 4, which shows a response for several critical threshold levels, if the number of signal samples shown spaced at 73 on curve 74 exceed the threshold level associated with the tracking matrix 46; which may be at a 60% duty cycle for example the system shifts to the Kalman filter. As long as the value of Y remains below the upper threshold, the system may continue tracking in accordance with the method and system of the present invention, with little degradation. However, when the value of Y exceeds the upper threshold which is used to distinguish between clutter and targets as shown in FIG. 4, it has been determined that tracking performance suffers. In such event, the system then utilizes its target state estimates of the Kalman filter and attempts to coast through the clutter region. Active tracking then resumes when the target frequency emerges from the clutter notch frequency area.

Figure 5:
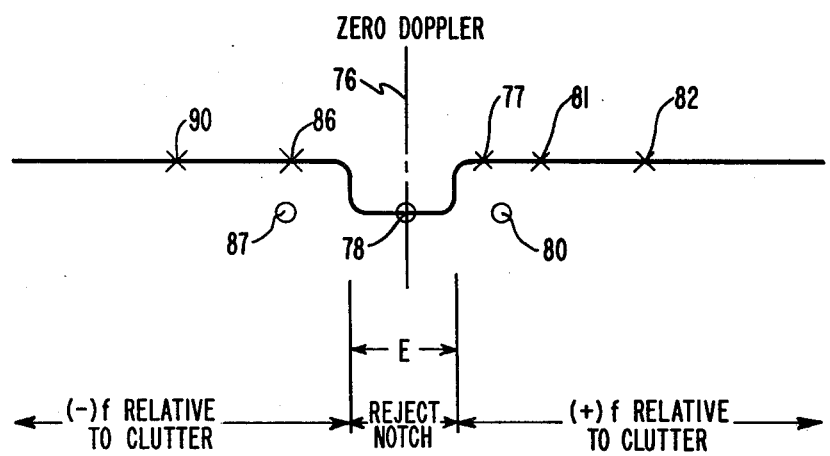
FIG. 5 is a diagram to illustrate the operation of the present invention for different target doppler frequencies.

Referring to the diagram of FIG. 5, the curve therein represents doppler frequency corresponding to the velocity of opening and closing targets, which increase along the curve in opposite directions from centerline 76 that represents zero doppler frequency. A depressed region of the curve extends for a distance E on each side of the centerline 76 to represent the rejection notch of the filter 36, which in one embodiment corresponds to a target that is moving either toward or away from the radar at a rate of less than 90 feet per second. The x marks of FIG. 5 represent a target, while the o marks represent clutter. The distance of the target and the clutter representations from the centerline 76 in either direction corresponds to the doppler frequency of the target and clutter relative to the notch. Referring to the curve, when a target 77 approaches the apparent velocity of the clutter, or in other words approaches the frequency of the clutter notch, the clutter detector and filter 48 directs the selector 63 to apply a signal on the output 44 that corresponds to a positive offset signal, which in the described embodiment, is approximately 1800 Hz, for example. A signal is output from the clutter detector 48 to open a switch 70 to disconnect the output of the track matrix formation 46 from the track error calculation and control 47. At this time, the clutter 78 (in FIG. 5) is assumed to be in the center of the clutter notch at approximately zero frequency. Upon application of the positive offset signal to line 44, the summing function 40 causes the clutter frequency at 78 to shift to position 80, which is outside of the rejection notch. This shifting effectively removes the clutter notch filter 36 from the system. Simultaneously, the positive offset signal is applied to the summing function 58 and to the summing function 61 over line 44. The application of such offset causes the frequency of the target to move from position 77 on the curve to position 81. In the event that the target should increase its doppler relative to the clutter notch or frequency of the clutter to a position such as 82, the clutter detector 48 would then remove the positive offset on line 44, causing the clutter to return to position 78 on the curve and the target frequency to return to a position in the neighborhood of 81.

Referring again to the curve of FIG. 5, assume that the target is at the edge of the notch at position 86, and the clutter is at the center of the notch at position 78, the clutter detector and filter detects the proximity of the two doppler frequencies relative position and applies a negative offset signal as previously described, which shifts the frequency of the clutter to position 87 and the target doppler to position 90 as shown in FIG. 4. When the doppler of the target increases above the corresponding 90 feet per second velocity, the clutter shifts back to 78 and the target to 86.

In summary, the method of the present invention which may be termed tracking through the filter notch, effectively eliminates the doppler blind region, inherent in pulse doppler radars, when the target frequency is coincident with that of main beam clutter. When the target frequency approaches that of main beam clutter, the track through the notch mode is commenced, and the clutter notch is effectively removed. This is accomplished as heretofore described by applying a frequency offset to the voltage controlled oscillator. The offset translates the entire spectrum including the target and main beam clutter out of the notch filter region where it can continue to be examined and tracked. Although the clutter spectrum offset technique applied to the voltage controlled oscillator is used in the specific embodiment, it is possible to provide other techniques, such as removing the effect of the clutter canceller, for example such other techniques appear to provide certain difficulties which for most applications appear to render the method and system less economical to manufacture. It should be pointed out that a pulse doppler system having a low to medium multiple pulse repetition frequency provides the greatest effectiveness for the system in that the probability of ambiguous range of the target and clutter being coincident is reduced, which would not be the case for a single or high PRF system. The doppler frequency in the vicinity of the target region is examined for the presence of unwanted signals, such as clutter, by placing thresholds on each of the filters of the track matrix, as previously mentioned. After computing the threshold for each filter of the matrix, which is a fraction of the assumed target echo amplitude, such threshold is then utilized to compare each filter of the track matrix to obtain an accumulation of the number of filters that exceed such threshold for each range. Such a comparison which in effect is computing the clutter to signal ratio, then determines whether or not clutter is present. Once the clutter is detected, the entire track matrix and the range, angle, and doppler trackers in the system are placed in the coast mode; that is, no new information is placed in the trackers in order to prevent clutter from disturbing the tracker's estimate of the target state. The state is not disturbed since it may be needed to coast through the clutter if the clutter is of sufficient magnitude to prevent the system of the present invention from tracking through the notch. Once the clutter is detected, it is monitored to determine the dwell time of the target in the clutter. Since the present embodiment contemplates a multiple PRF system, it is entirely possible for one PRF to be clear and another PRF saturated with clutter, as previously mentioned. This could occur when the target and clutter are in different range modulos. The system then detects such a situation and permits tracking to occur since the radar may track easily with only a portion of its full complement of data. The monitor is mechanized as a low pass filter where $Y(N)=0.9*Y(N-1)+0.1*I$, where $I=1$ clutter and $I=0$ no clutter.

Appendix A to this specification is a printout of an assembly language program with descriptive text to illustrate one specific software implementation of the method and system of the present invention. Although the inclusion of such programs may not be considered necessary by a person skilled in the art for an understanding of the present invention, they are included to insure the elimination of any undue experimentation in its actual implementation. Referring to such appendix, the system, of course, is constantly checking the track matrix to detect clutter. Once a target doppler frequency is detected as corresponding to a velocity of eighty-five feet per second, for example, the program D6 COAST is called which is the program for commencing tracking through the notch in accordance with the present invention. Then the clutter threshold is computed and detected by program Z1. The offset is then applied by such program D6, and the clutter is monitored as described in connection with FIG. 4. If the clutter is detected, the information in the track matrix is effectively erased to prevent errors in estimating. If the clutter is below the threshold (FIG. 4) the system continues tracking with the effect of the notch filter eliminated until the target velocity exceeds the exemplary value.

```
. ****** THIS ROUTINE IS CALLED DURING COAST MODE 1 (TTN).
      ITS PURPOSE IS TO MONITOR THE CLUTTER DETECTOR FROM Z1 AND
      TO COMMAND MBC COAST IF THE CLUTTER IS TOO SEVERE FOR TRACKING

D6COAST   LD    A0,COAST
          TEZ   A0            . FIRST TIME HERE?
          J     D6CST02       . NO
```

|          |       |              | -continued                          |
|----------|-------|--------------|-------------------------------------|
|          | LD    | A0,ZERO      |                                     |
|          | ST    | A0,CLJTDET   |                                     |
|          | ST    | A0,OVERRIDE  |                                     |
|          | LD    | A0,FRACT1    |                                     |
|          | ST    | A0,OBS       |                                     |
| D6CST02  | LDM   | A1,.55       | . CLUTTER THRESHOLD FOR LOW PRF     |
|          | LD    | A0,OVERRIDE  |                                     |
|          | TEZ   | A0           | . HIGH PRF?                         |
|          | J     | $+3          | . NO                                |
|          | LDM   | A1,.8        | . YES                               |
|          | ST    | A1,TEMP      |                                     |
|          | LD    | A0,CLUTDET   | . CLUTTER DETECTOR FROM Z1          |
|          | CMP   | A0,TEMP      | . TOO MUCH CLUTTER?                 |
|          | J     | $+2          | . YES                               |
|          | J     | D6CST05      | . NO                                |
|          | LD    | A0,OVERRIDE  |                                     |
|          | TEZ   | A0           | . ALREADY TRIED DIFFERENT PRF?      |
|          | J     | D6CST10      | . YES - GO TO COAST                 |
|          | LD    | A0,ZERO      | . NO                                |
|          | ST    | A0,CLJTDET   |                                     |
|          | LD    | A0,FRACT1    |                                     |
|          | ST    | A0,DBS       |                                     |
|          | LD    | A0,ONE       |                                     |
|          | ST    | A0,OVERRIDE  |                                     |
| D6CST05  | LDM   | A0,180       | . 90 FT/SEC (2+14)                  |
|          | ST,   | A0,D6NOTWID  | . EXPAND NOTCH FOR HYSTERISIS       |
|          | LD    | A0,BASTRD    |                                     |
|          | ST    | A0,COAST     | . COMMAND COAST MODE 1 (TTN)        |
|          | LD    | A0,TRKVEL    | . TGT VEL WRT MBC (VMBC-VTGT)       |
|          | DMPM  | A0,012       | . VEL .LT. 5FT/SEC?                 |
|          | J     | $+2          | . NO                                |
|          | J     | D6CST20      | . YES - DON'T CHANGE OFFSET-(HYSTERESIS) |
|          | LDM   | A1,01604     | . 1800 HZ(2+16)                     |
|          | TGEZ  | A0           |                                     |
|          | N     | A1,NEG1      |                                     |
|          | ST    | A1,VOFFSET   | . SETUP VCXD OFFSET                 |
|          | J     | D6DST20      |                                     |
| D6CST10  | LD    | A0,ONE       |                                     |
|          | ST    | A0,COAST     | . COMMAND COAST MODE 2 (MBC COAST)  |
|          | LD    | A0,ZERO      |                                     |
|          | ST    | A0,VOFFSET   | . CLEAR OUT OFFSET                  |
|          | ST    | A0,OVERRIDE  | . CLEAR PRF OVERRIDE                |
| D6CST20  | RS    | A2           |                                     |
|          | PAGE  |              |                                     |

. ****** SEARCH FOR LARGEST FILTER IN RANGE GATE 2 FILTERS 4,5,6

JS    A2,Z1FSERCH . COMPUTE OFFSET TO LARGEST FILT-Z1MAXOFS

. ****** CHECK TRACK MATRICIES FOR CLUTTER

|            |      |              |                    |
|------------|------|--------------|--------------------|
|            | LD   | MQ,Z-1ZERO   |                    |
|            | LD   | A2,Z1ONE     | TWO RGS            |
| Z1DET060   | ST   | A3,Z-1TEMP   | . SAVE A3          |
|            | SLL  | MQ,2         | . MQ = Z1CDET      |

. ****** COMPUTE CLUTTER THRESHOLD

|          |       |              |                                |
|----------|-------|--------------|--------------------------------|
|          | A     | A3,Z1MAXOFS  |                                |
|          | LDA   | A2,+55       | . LK1 RG2 TGT FLT              |
|          | AA    | A2,+66       | . LK1 RG3 TGT FLT              |
|          | S     | A3,Z1MAXOFS  |                                |
|          | SRL   | A2,2         | . A2 = (AVG TARGET SIGNAL LK1)/2 |
|          | CMPM  | A2,011       | . THRESHOLD TOO SMALL?         |
|          | J     | $+3          | . NO                           |
|          | LDM   | A2,011       | . YES, USE MINIMUM             |
|          | ST    | A2,Z1CLTHRS  | . CLUTTER THRESHOLD            |

. ****** DETECT CLUTTER

|          |       |              |                      |
|----------|-------|--------------|----------------------|
|          | LD    | A0,Z1SEVEN   | . EIGHT FILTERS      |
| Z1DET070 | LDA   | A1,+40       | . RG 1               |
|          | S     | A1,Z1CLTHRS  |                      |
|          | TLEZ  | A1           | . CLUTTER DETECTED?  |
|          | J     | Z1DET080     | . YES                |
|          | LDA   | A1,+73       | . RG 4               |
|          | S     | A1,Z1CLTHRS  |                      |
|          | TLEZ  | A1           | . CLUTTER DETECTED?  |
|          | J     | Z1DET080     | . YES                |
|          | A     | A3,Z1ONE     |                      |

-continued

```
               JC      A0,$-Z1DET070
               LD      A3,Z1TEMP
               LDA     A1,+51              . RG2 FLT1
               S       A1,Z1CLTHRS
               TLEZ    A1                  . CLUTTER DETECTED?
               J       Z1DET080            . YES
               LDA     A1,+52              . RG2 FLT2
               S       A1,Z1CLTHRS
               TLEZ    A1                  . CLUTTER DETECTED?
               J       Z1DET080            . YES
               LDA     A1,+58              . RG2 FLT8
               S       A1,Z1CLTHRS
               TLEZ    A1                  . CLUTTER DETECTED?
               J       Z1DET080            . YES
               LDA     A1,+62              . RG3 FLT1
               S       A1,Z1CLTHRS
               TLEZ    A1                  . CLUTTER DETECTED?
               J       Z1DET080            . YES
               LDA     A1,+63              . RG3 FLT2
               S       A1,Z1CLTHRS
               TLEZ    A1                  . CLUTTER DETECTED?
               J       Z1DET080            . YES
               LDA     A1,+69              . RG3 FLT8
               S       A1,Z1CLTHRS
               TLEZ    A1                  . CLUTTER DETECTED?
Z1DET080       A       MQ,Z1THREE          . YES
               LDX     A3,DSPDATA
               AM      A3,GLOBAL1
               JC      A2,$-Z1DET0600
               ST      MQ,Z1CDET           . CLUTTER DETECT WORD
               ST      MQ,Z1DET            . TOTAL DETECTION WORD
               LDM     A0,.0625            . 1 × .0625
               SM      MQ,017
               TEZ     MQ                  . BOTH LOOKS GOT CLUTTER?
               LD      A0,Z1ZERO           . NO
               ST      MQ,Z1CLUTER         . INPUT TO CLUTTER DETECTION FILTER

.****** CLUTTER DETECTION FILTER Y(N) = .9375*Y(N−1) + .0625*I  I=0 OR 1

LDX     A2,CLJTDET
               SRL     A2,4
               S       A2,Z1CLUTER         . ½**4 × (Y-I)
               ST      A2,Z1TEMP1
               LDX     A2,CLUTDET
               S       A2,Z1TEMP1
               STX     A2,CLUTDET

.****** END OF PROGRAM

Z1DET090       LD      IX,Z1IXSAV          . RESTORE IX
               LD      A3,Z1A3SAV          . RESTORE A3
               LD      IC,Z1RET            . *** RETURN ***
               PAGE
               RS      A2                  . ** RETURN **
               PAGE

.**** THIS ROUTINE SEARCHS FILTERS 4,5, AND 6 FOR THE MAXIMUM AND
.     RETURNS AN OFFSET INDICATING THE LARGEST FILTER

Z1FSERCH       LDM     MQ,0177777          . INITIALIZE OFFSET TO FILTER 4
               LD,     A0,+54              . FLT4 RG2 LK2
               AA      A0,+54              . +FLT4 RG2 LK1
               ST      A0,Z1TEMP1          . INITIALIZE MAX AS FILTER 4
               LD,     A0,+55              . FLT5 RG2 LK2
               AA      A0,+55              . +FLT5 RG2 LK1
               CMP     A0,71TEMP1          . FLT5 > FLT4?
               J       $+2                 . YES
               J       Z1FS010             . NO
               LD      MQ,Z1ZERO           . SET OFFSET TO FILTER 5
               ST      A0,Z1TEMP1          . SET MAX TO FILTER 5
Z1FS010        LD,     A0,+56              . FLT6 RG2 LK2
               AA      A0,+56              . +FLT6 RG2 LK1
               CMP     A0,Z1TEMP1          . FLT6 > FLT4?
               LD      MQ,Z1ONE            . YES, SET OFFSET TO FILTER 6
               ST      MQ,Z1MAXOFS
               RS      A2                  . *** RETURN ***
               PAGE
```

What we claim is:

1. A method of continuing the tracking of targets in a pulse doppler radar system having a clutter notch filter and a tracking filter matrix, at times when the doppler frequency of the target approximates the doppler frequency of clutter, comprising eliminating the rejection effect of the clutter notch filter on received echo signals at said times to not reject the clutter or the target signals, providing a threshold value for the received unrejected echo signals, comparing the amplitude of the received unrejected echo signals having selected ranges and doppler frequencies approximating the doppler frequency of the target with the threshold value, and continuing the tracking of the target in accordance with the amplitude comparison of the unrejected target and clutter signals.

2. A method according to claim 1 wherein the step of eliminating the effect of the clutter notch filter comprises shifting the doppler frequency of the target and clutter signals to eliminate the rejection characteristics of the notch.

3. A method according to claim 1 wherein the step of eliminating the effect of the clutter notch filter comprises shifting in the same direction the doppler frequency of the target and clutter signals away from the frequency of the notch, and selecting the shifting direction in accordance with the detected direction of the target doppler frequency to optimize the difference between the target doppler and the notch doppler.

4. A method according to claim 1 or 2 or 3 wherein the steps of providing a threshold value and comparing comprise computing a selected fraction of the amplitude of the received signals for each range and doppler frequency of the track matrix, and comparing the value of each filter in the vicinity of the target region of the track matrix with the computed threshold value.

5. A method according to claim 1 or 2 or 3 wherein the step of continuing the tracking of the target comprises detecting amplitudes of signals above the threshold value of filters in the vicinity of the target region of the track matrix at times when a selected number of such amplitudes do not exceed the threshold value.

6. In a pulse doppler radar system that includes provision for tracking targets, the improvement of means for detecting the doppler frequency of a target being tracked and the doppler frequency of clutter, means for eliminating the rejection effect of a main beam clutter notch filter to not reject the target and clutter echo signals, at times when the frequency of said notch filter and the doppler frequency of said target differ by less than a predetermined value, means for detecting the amplitude of received echo signals for a selected number of ranges at a predetermined number of frequencies in the immediate vicinity of the tracked targets, means for comparing the amplitude of said detected predetermined frequencies to a threshold value for each of the selected number of ranges to determine the number of the predetermined frequency signals exceeding the threshold value, and means to use said predetermined frequency signals to control the tracking of said target at times when the amplitude of a selected portion of the predetermined frequency signals does not exceed the threshold value.

7. In a system according to claim 6 wherein the means for eliminating the effect of the main beam clutter filter to not reject the clutter, comprises shifting the detected doppler frequency of both the doppler frequency of the target and the main beam clutter away from the rejection frequency of the notch filter.

* * * * *